(12) United States Patent
Stow et al.

(10) Patent No.: US 7,182,364 B2
(45) Date of Patent: Feb. 27, 2007

(54) AIR BAG

(75) Inventors: David Stow, Gothenburg (SE); Simon Valkenburg, Hamburg (DE); Altay Kismir, Tilbury (CA); Anorin Shaker, Chatham (CA)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/393,530

(22) Filed: Mar. 20, 2003

(65) Prior Publication Data

US 2003/0189322 A1    Oct. 9, 2003

(30) Foreign Application Priority Data

Mar. 27, 2002    (GB)    .................. 0207247.8

(51) Int. Cl.
*B60R 21/16*    (2006.01)
*B60R 21/213*    (2006.01)
*B60R 21/233*    (2006.01)

(52) U.S. Cl. .................. 280/729; 280/730.2; 280/743.1

(58) Field of Classification Search ................ 280/729, 280/730.2, 743.1
See application file for complete search history.

(56) References Cited

U.S. PATENT DOCUMENTS

| 6,099,029 | A | * | 8/2000 | Håland et al. ............ 280/729 |
| 6,170,860 | B1 | * | 1/2001 | Denz et al. ............ 280/730.2 |
| 6,458,724 | B1 | * | 10/2002 | Veiga et al. ............ 280/729 |
| 6,698,458 | B1 | * | 3/2004 | Sollars et al. ............ 280/728.1 |
| 2005/0006883 | A1 | * | 1/2005 | Sato et al. ............ 280/730.2 |

* cited by examiner

*Primary Examiner*—Paul N. Dickson
*Assistant Examiner*—Joselynn Y. Sliteris
(74) *Attorney, Agent, or Firm*—Madson & Austin

(57) ABSTRACT

An air bag formed from two layers of fabric using a one-piece weaving technique has a peripheral seam at the edge of a region adapted to be inflated. Beyond the seam there are a plurality of chambers and gas escaping from the inflated region through the seam must inflate these chambers thus creating a back pressure to reduce the flow of escaping gas.

5 Claims, 2 Drawing Sheets

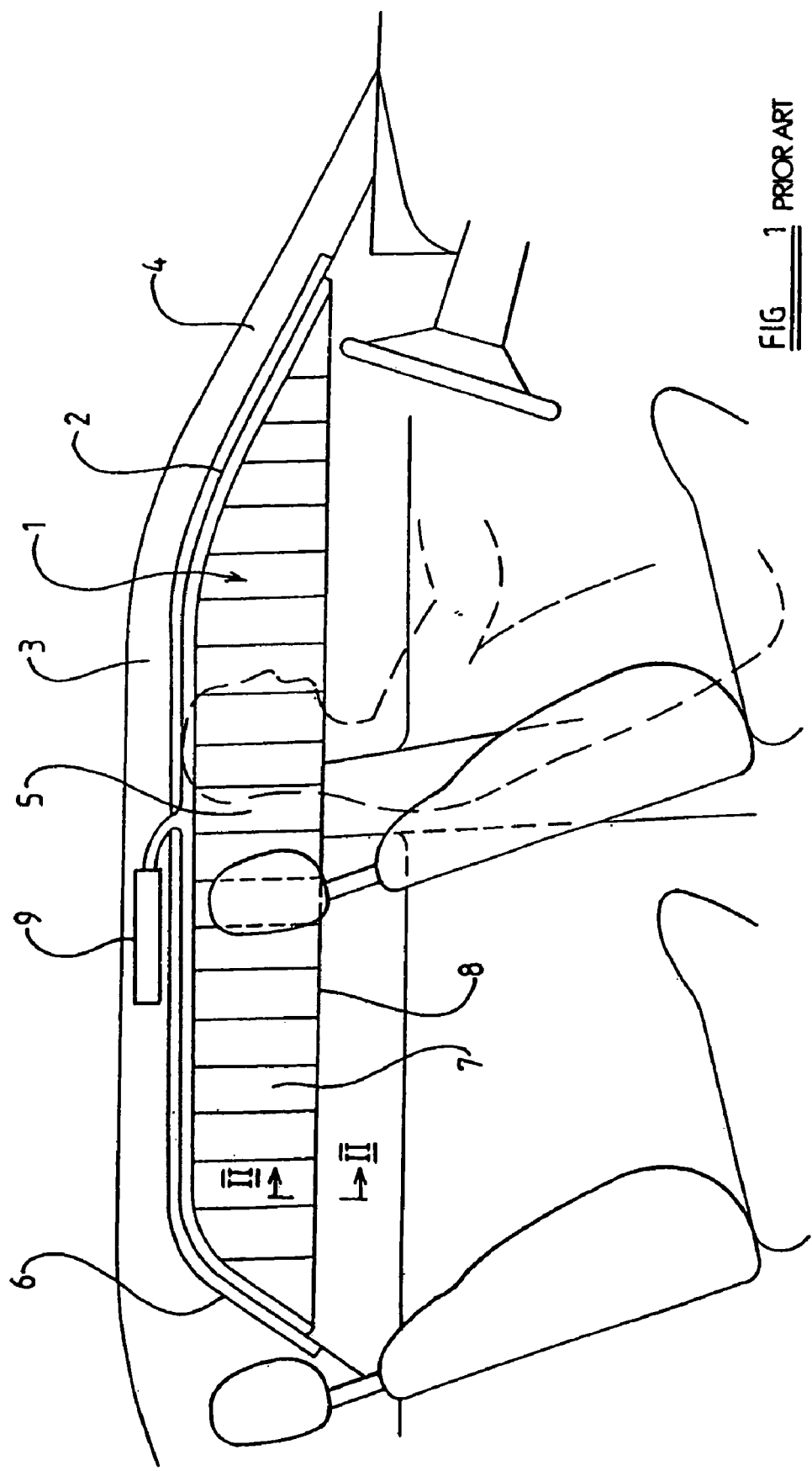

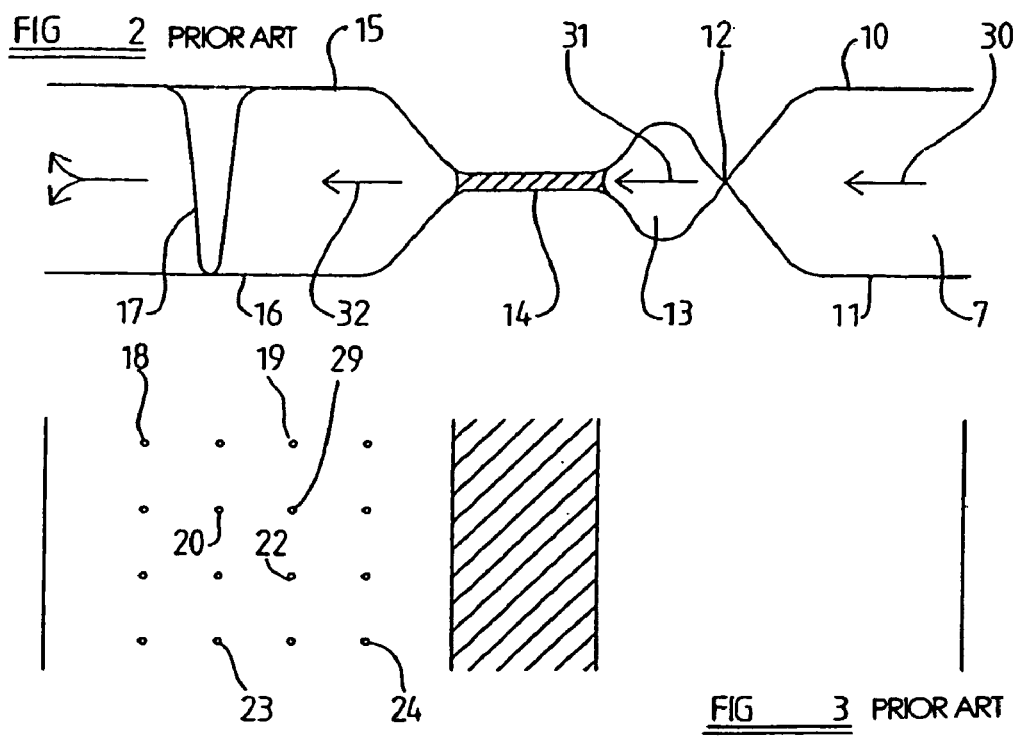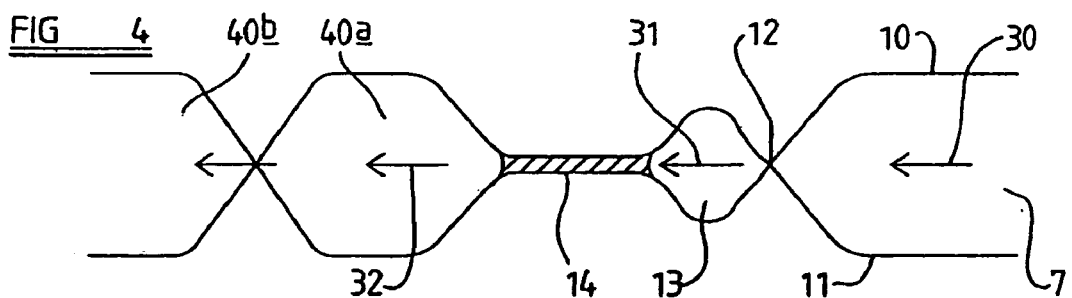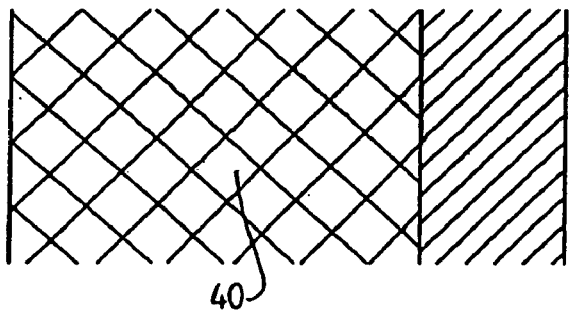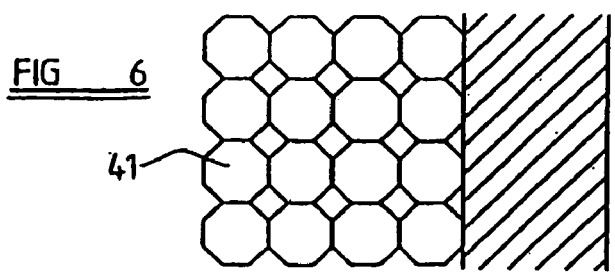

a patent page

AIR BAG

BACKGROUND OF THE INVENTION

1. Field of the Invention

THE PRESENT INVENTION relates to an air bag and more particularly relates to an air bag adapted to remain inflated for a relatively long period of time.

2. Description of Related Art

Whilst air bags intended to protect occupants of motor vehicles from a front impact are usually intended to remain inflated for a relatively short period of time, typically much less than half a second, there is a growing requirement for air bags that can remain inflated for a much longer period of time. For example, it has been proposed to provide motor vehicles with so called inflatable curtains which are intended to provide protection in the event that a side impact or, in particular, a roll-over accident should occur. It is desirable for such an inflatable curtain to be capable of remaining inflated for at least five to six seconds, which is the average time period for a roll-over incident.

Present day fabric, coatings and seam portions are relatively gas-tight, as compared with the fabrics, coatings and seams that were conventional several years ago, but it has been found that in many present day air bags, particularly air bags in the form of inflatable curtains, there is an undesirable gas leak through the peripheral seam. This may prevent an inflatable curtain from remaining inflated for a sufficiently long period of time.

Attempts to improve the situation by using coatings or films on the outside of the air bag are extremely costly.

SUMMARY OF THE INVENTION

The present invention seeks to provide an improved air bag.

According to this invention there is provided an air bag, the air bag being a one-piece-woven air bag having at least two layers of fabric which are interconnected by a seam, the seam serving to separate an inflatable part of the air bag from a peripheral or uninflatable region of the air bag, the said region of the air bag being provided with a plurality of substantially hermetically sealed cells or chambers.

Preferably, the air bag is provided with an exterior coating or film.

Conveniently, the cells or chambers are of diamond configuration.

Preferably, the seams are defined by a region where the warp and weft yarns of the two layers of fabric are woven together to form the seam, therebeing a generally cylindrical chamber adjacent to the side of the seam remote from said plurality of cells. Advantageously, the air bag is in the form of an inflatable curtain.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a diagrammatic illustration of an air bag in accordance with the prior art.

FIG. 2 as a cross sectional view of part of the periphery of the air bag of FIG. 1 taken on the line II—II, FIG. 3 is a plan view of part of the air bag of FIG. 1

FIG. 4 is a sectional view corresponding to FIG. 2 illustrating an air bag in accordance with the invention, FIG. 5 is a plan view corresponding to FIG. 3 illustrating one embodiment of an air bag in accordance with the invention, and FIG. 6 is a view corresponding to FIG. 5 illustrating another embodiment of an air bag in accordance with the invention.

DETAILED DESCRIPTION OF THE INVENTION

Referring now to FIG. 1, an air bag in the form of an inflatable curtain 1 is illustrated. The air bag is adapted to be mounted in a motor vehicle to provide protection for an occupant of the motor vehicle in the event that a side impact or roll-over accident should occur.

The inflatable curtain 1 has a non linear, which is to say non-straight, upper edge 2 which is secured to the roof 3 of a motor vehicle such that the upper edge 2 of the inflatable curtain extends along part of the A-post 4 of the vehicle, across the top of the door openings and thus across the top of the B-post 5 of the motor vehicle and extends part way down the C-post 6 of the motor vehicle. The inflatable curtain I is divided into a plurality of vertical cells 7 and the inflatable curtain 1, when inflated (as shown in FIG. 1) has a substantially straight or linear lower edge 8. The inflatable curtain 1 is associated with a gas generator 9 adapted to inflate the inflatable curtain in the event that an accident should occur.

The inflatable curtain is initially stored in a recess or housing which extends along the A-post, across the door openings of the vehicle and part way down the C-post, and the lower edge 8, when the inflatable curtain is uninflated, has a sufficient length to enable it to be received within the recess. On inflation of the inflatable element the cells distend, and thus the total width of each cell effectively reduces as the cell changes from a substantially flat configuration to a rounded configuration. Thus the lower edge of the inflatable curtain is tensioned between anchoring points provided on the vehicle.

Many inflatable curtains of this general design have been produced in recent years, and the inflatable curtain illustrated in FIG. 1 is merely given as an example.

FIG. 2 is a partial sectional view taken generally on the line II—II of FIG. 1 illustrating a peripheral seam forming part of a prior proposed air bag of the type shown in FIG. 1.

Referring now to FIG. 2, the peripheral seam of the air bag is shown. The air bag is formed using a one piece weaving technique which means that the two layers of fabric forming the bag are woven simultaneously and the weft yarns of one layer of fabric cross or become interwoven with the weft yarns of the other layer of fabric at certain points, so that seams are generated during the weaving process. A one piece weaving process of this type is well known.

The lower part of a cell 7 is formed from a first layer of fabric 10 and a second layer of fabric 11. At the bottom part of the chamber 7 the weft yarns of the fabric layers 10 and 11 intersect within a region 12, about a single warp yarn, and then re-separate to define a relatively narrow cylindrical chamber 13 which extends immediately adjacent a further region 14 where the warp and weft yarns are interwoven to form a single integral web or fabric layer which constitutes a peripheral seam for the chamber 7. Immediately beyond the seam 14, the warp and weft yarns of the layers 10 and 11 again form two almost discrete layers 15, 16 in a so-called "skeleton" region. The "skeleton" region forms the periphery of the air bag. Within this region, at selected points, a weft yarn, such as the weft yarn 17, will extend from one of the layers 16 to the other layer 15 to surround a warp yarn of that other layer, thus relatively loosely joining the two layers together at a single point. The yarns which effect this interconnection between the two layers are spaced apart on a point matrix, as identified by the points 18 to 24 as shown in FIG. 3.

The air bag is provided with an external coating or film of an appropriate material, as well known in the art, to enhance the gas-tightness of the air bag.

On inflation of the inflatable curtain, gas will flow 30, towards the peripheral edge part of the air bag as shown in FIGS. 2 and 3. Part of the gas will flow through the cross over region 12 and will inflate the cylindrical chamber 13. The gas will tend to remain within the total boundary defined by the fabric layers because of the external coating. As the chamber 13 inflates so a back pressure is generated which serves to resist the further ingress -of gas into the chamber 13 from the main chamber 7. However, gas will still enter the chamber 13 from the main chamber 7 as some gas will leave the chamber 13 and flow through the seam area 14, as indicated by the arrow 31, then flowing, as indicated by the arrow 32, through the skeleton region defined by the fabric layers 15 and 16. This leakage of gas may lead to a situation where the inflatable curtain deflates prematurely.

Referring now to FIGS. 4 and 5, in an air bag in accordance with the invention the peripheral seam has a design which is slightly, but very importantly, different to that of the conventional design as described above with reference to FIGS. 2 and 3.

As in the embodiment of FIGS. 2 and 3, again the lower part of the chamber 7 is defined by two fabric layers 10 and 11 which intersect in the region 12 and subsequently diverge to form a chamber 13, again recombining to form a seam 14, as described above. However, in this embodiment, the warp yarns, in the "skeleton" region adjacent the seam 14, are selectively interwoven to form a plurality of adjacent substantially hermetically sealed cells 40. In the embodiment shown in FIGS. 4 and 5 the cells are a substantially "diamond" shape, but the cells could be of any configuration. In the embodiment of FIGS. 4 and 5 the cells are immediately adjacent each other but the cells could be spaced apart, being divided from each other by seams of any appropriate configuration.

On inflation of an air bag having a peripheral seam of the type described with reference to FIGS. 4 and 5, gas from the chamber 7 will again flow, as indicated by the arrow 30, into the cylindrical chamber 13 against a back-pressure generated within that chamber, and some gas will then flow, as indicated by the arrow 31 through the seam region 14, and will then enter, as indicated by the arrow 32 a first of the plurality of cells 40, identified as cell 40a. The cell 40a will inflate. Some gas inflating the cell 40a will pass through the seam between the cell 40a and the next adjacent cell 40b which will also inflate, and so on. However, the cell 40a, on inflation, will exert a back pressure which will tend to resist the flow of further gas through the seam portion 14 and the cell 40b, when inflated, will tend to resist any flow of gas out of the cell 40a into the cell 40b.

Whilst several of the cells 40 may inflate over a period of time, the effect of the cells 40 is to resist the flow of gas passing through the seam 14, and this will help prolong the period of time for which the air bag remains inflated.

FIG. 6 illustrates an embodiment which is similar to that of FIGS. 4 and 5 in which there are octagonal cells 41 instead of the diamond shaped cells 40.

While the invention has been described with reference to embodiments having two layers of fabric, the invention may be used with air bags which have three or more fabric layers.

Whilst the invention has been described with reference to one form of air bag in the form of a specific inflatable curtain it is to be appreciated that the invention may be applied to other forms of inflatable curtain and, indeed, may be applied to any other form of air bag formed from two layers of fabric having a peripheral seam where it is desired that the air bag should remain inflated for a relatively long period of time.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air bag, the air bag comprising a one-piece woven air bag having at least two layers of fabric which are interconnected by a seam, the seam serving to separate an inflatable part of the air bag from a peripheral region of the air bag, said region of the air bag being provided with a plurality of substantially hermetically sealed cells or chambers configured to inflate only upon leakage of inflating gas from the inflatable part of the air bag through said seam so as to resist the further flow of gas through the seam, wherein the cells or chambers are of diamond configuration.

2. An air bag according to claim 1 wherein the air bag is provided with an exterior coating or film.

3. An air bag according to claim 1 wherein each of said two layers of fabric has warp and weft yarns and wherein the seam is defined by a region where the warp and weft yarns of the two layers of fabric are woven together to form the seam, there being a generally cylindrical chamber adjacent to a side of the seam remote from said plurality of cells.

4. An air bag according to claim 1 having the form of an inflatable curtain.

5. An air bag according to claim 1 wherein the plurality of substantially hermetically sealed cells or chambers comprises a first substantially hermetically sealed cell or chamber disposed adjacent the seam and configured to inflate only upon leakage of inflating gas from the inflatable part of the air bag through said seam so as to resist the further flow of gas through the seam, wherein the plurality of substantially hermetically sealed cells or chambers further comprises a second substantially hermetically sealed cell or chamber configured to inflate upon leakage of inflating gas from the first substantially hermetically sealed cell or chamber so as to resist the further flow of gas from the first substantially hermetically sealed cell or chamber.

* * * * *

UNITED STATES PATENT AND TRADEMARK OFFICE
CERTIFICATE OF CORRECTION

| | | |
|---|---|---|
| PATENT NO. | : 7,182,364 B2 | Page 1 of 1 |
| APPLICATION NO. | : 10/393530 | |
| DATED | : February 27, 2007 | |
| INVENTOR(S) | : David Stow et al. | |

It is certified that error appears in the above-identified patent and that said Letters Patent is hereby corrected as shown below:

Column 1, line 50, please delete "yams" and replace it with --yarns--.

Column 2, line 52, please delete "yams" and replace it with --yarns--.

Column 3, line 37, please delete "yams" and replace it with --yarns--.

Signed and Sealed this

Seventh Day of August, 2007

JON W. DUDAS
*Director of the United States Patent and Trademark Office*